United States Patent [19]
Termansen et al.

[11] 3,978,879
[45] Sept. 7, 1976

[54] CONTROL MEANS FOR HYDROSTATIC STEERING SYSTEMS AND THE LIKE

[75] Inventors: Poul Erik Termansen, Sonderborg; Thorkild Christensen, Nordborg, both of Denmark

[73] Assignee: Danfoss A/S, Nordborg, Denmark

[22] Filed: June 26, 1974

[21] Appl. No.: 483,115

Related U.S. Application Data

[63] Continuation of Ser. No. 385,891, Aug. 6, 1973, abandoned.

[30] Foreign Application Priority Data
Aug. 14, 1972 Germany............................ 2240012

[52] U.S. Cl.................................. 137/115; 91/436; 91/446; 137/491; 137/493; 137/596.12
[51] Int. Cl.²............................................ B62D 5/08
[58] Field of Search ............. 91/436, 446; 137/106, 137/115, 491, 493, 596.12, 596.13

[56] References Cited
UNITED STATES PATENTS

| | | | |
|---|---|---|---|
| 3,319,653 | 5/1967 | Stephens........................... | 91/436 X |
| 3,710,824 | 1/1973 | Lohbauer........................ | 137/491 X |
| 3,779,133 | 12/1973 | Dezelan........................... | 91/446 X |

*Primary Examiner*—Alan Cohan
*Assistant Examiner*—Gerald A. Michalsky

[57] ABSTRACT

The invention relates to a control valve assembly for a hydrostatic control system such as power steering assembly. A common control valve assembly of this type has relatively rotatable inner and outer elements connected respectively to a vehicle steering wheel and a servomotor. Paired holes in the inner and outer element permit the flow of fluid therethrough when the unit is in its neutral position with the paired holes in respective registration. In hydrostatic steering system of this type impact is sometimes applied to the steering wheel when the working motor connected to the steered wheels is suddenly loaded, e.g. when the wheels strike a stone. Such impacts on the steering wheel are avoided by providing a one-way valve in a section of the working path through which fluid flows to the working motor. Pressure regulating valve means, excess pressure valve means and emergency control valve means are associated with the one-way valve assembly.

3 Claims, 3 Drawing Figures

CONTROL MEANS FOR HYDROSTATIC STEERING SYSTEMS AND THE LIKE

This is a continuation of application Ser. No. 385,891, filed Aug. 6, 1973, now abandoned.

The invention relates to a control means for hydrostatic steering systems and the like in which a steering member and a measuring motor, which can be connected in series with a working motor, are connected by a follower device which upon displacement from the neutral position first displaces a reversing valve and after movement through a predetermined rotary angle effects a mechanically positive connection between the steering member and the measuring motor, the reversing valve connected between the pump union and the return union having neutral position openings, through which a by-pass extends in the neutral position, and reversing openings through which a working path is establishd on closure of the neutral position holes when relative movement occurs, which working path comprises sections through which, during operation, fluid flows in both directions and in only one direction for the purpose of adjusting the working motor and the measuring motor in dependence upon the steering direction, and in particular the follower device and the reversing valve being formed with the aid of two rotary slides, and the measuring motor is connected in series with the working motor irrespective of the steering direction.

A steering means of this kind is disclosed in U.S. Pat. No. Re 25,126. In this an outer rotary slide is connected to the measuring motor and an inner rotary slide to the steering wheel. The neutral position holes and the reversing openings are formed in these rotary slides. The rotary slides are rotatable relatively to each other against spring force and move into positive driving engagement with each other after rotation through a predetermined angle, so that the measuring motor can be operated by the steering wheel to act as an emergency pump should the main pump break down. The neutral position holes have a very small diameter and are closed after rotary movement through a correspondingly small angle. A passage runs from the pump union to a peripheral channel in the outer rotary slide; the neutral position holes extend directly from this channel, and other holes which lead to the reversing openings also run from it.

In accordance with an earlier filed patent application Ser. No. 304,144, filed Nov. 6, 1972, now U.S. Pat. No. 3,805,838, neutral position holes of at least three different sizes are provided in order to uncover the neutral position holes and the reversing openings in overlapping relationship so as to avoid a too sudden change over from the by-pass to the working path.

In the case of other control means, as described in U.S. Pat. Nos. 2,334,918, and 2,918,135, the reversing valve takes the form of an axial slide which is mchanically connected to the follower device.

It has been found that in the case of hydrostatic steering systems comprising such control means impact is sometimes applied to the steering wheel when the working motor is suddenly loaded, e.g. when the steered wheels strike a stone, but that this is not always so every time the working motor is loaded in this way. The object of the invention is therefore to provide a control means on the initially stated kind in which such impacts on the steering wheel are avoided.

According to the invention this object is achieved by fitting a non-return valve in a section of the working path through which the fluid flows in one directon, which valve is disposed to the rear of the point at which said path branches from the by-pass.

Upon changeover from the neutral position to a working position there is a zone in which the reversing openings are already partly uncovered but in which the neutral position openings are not yet fully covered. This overlapping zone can be created intentionally or may occur without being required, because of the usual manufacturing tolerances. If, within this overlapping zone, an external force, opposed to the direction of displacement at the particular moment, is applied to the working motor, then the pressurized fluid is displaced from the working motor in a direction opposite to that in which the pump is delivering. This pressurized fluid can flow away through the partially open overflow openings and the partially open neutral position holes and pass to the return side. Consequently, the measuring motor turns in a direction opposite to the steering direction and after a short distance drives that steering wheel through the follower device. This results in the troublesome impact. The incorpoation of the non-return valve prevents pressurized fluid from being forced to the return side from the working motor and through the measuring motor, the reversing openings and the neutral position holes. Consequently the measuring motor is not turned in the reverse direction and the steering wheel does not suffer impact. The special position of the non-return valve, i.e. in a section of the working path through which fluid flows in one direction and to the rear of the point at which said path branches from the by-pass, ensures that the non-return valve performs its function correctly without inerfering with the normal operation.

It is particularly advantageous if the non-return valve is arranged in a passage which leads from that part of the by-pass connecting the pump union and the neutral position holes to the pressure side reversing openings. When such an arrangement is used only one non-return valve is needed for both steering directions. It is advantageous to arrange the non-return valve on the pressure side since back compression forces of any magnitude can be taken up. It is also of advantage if the non-return valve is positioned in the working path at a point adjacent to the measuring motor which preferably is likewise always in the intake.

A particularly simple construction is obtained if the pump union and the return union are connected by a duct from which runs a passage portion leading to the pressure side reversing openings, and which is closed on the pump side by the non-return valve and on the return side by an emergency control valve, which opens when the measuring motor is driven by hand as an emergency pump, and/or an excess pressure valve. By means of this duct, the passage section leading to the reversing openings is connected directly to the return side through the emergency control valve during emergency control operation. A duct of this kind can also be used for relaxing excess pressure. Hitherto, it has always been the practice to provide an excess-pressure valve with a separate path externally of the control means.

For example, there may be fitted in the duct an insert which leads to the non-return valve, provides a backing for the spring of the non-return valve and forms the seat for the emergency control valve. This results in a very simple construction.

Particular advantage accrues if the closing member of the emergency control valve is a hollow plunger which surrounds the spindle of the closing member of the non-return valve thereby forming a flow restricting point and which, along a line extending around and at a midway point of its end face, bears against its seat, and if the interior of the hollow plunger is connected to the suction union through the excess pressure valve. Since, at that of its ends remote from the seat, the hollow plunger has a surface, exposed to the pump pressure, that is greater than that of its end presented to the seat, the emergency control valve is normally firmly closed. It only opens when the measuring motor is used as an emergency pump and a low pressure is produced instead of the pump pressure, or when the excess-pressure valve opens, when excess pressure occurs, and there occurs at the flow restricting point a drop in pressure which likewise opens the emergency control valve. Since the excess-pressure valve and the emergency control valve are now open, a large cross section is formed to enable the excess pressure to be relaxed.

The spindle of the non-return valve can then be formed as a slide which connects the entry of the excess pressure valve to the suction union when the non-return valve is closed, and connects said entry to the interior of the hollow plunger when the non-return valve is opened. This ensures that the excess-pressure valve only responds when the non-return valve is opened, i,e. when the control means is operating in the normal manner.

The arrangement in accordance with the invention can be used in a very advantageous manner in conjunction with a reversing valve in which the neutral position holes of different sizes are gradually closed when the reversing openings are being uncovered. This form of the neutral position holes results in a very smooth control operation free from vibrations. As a result of the large overlapping zone it is however particulary sensitive as regards impacts on the steering wheel.

The invention will now be described in greater detail by reference to preferred forms of construction illustrated in the drawing, in which.

Figure 1:
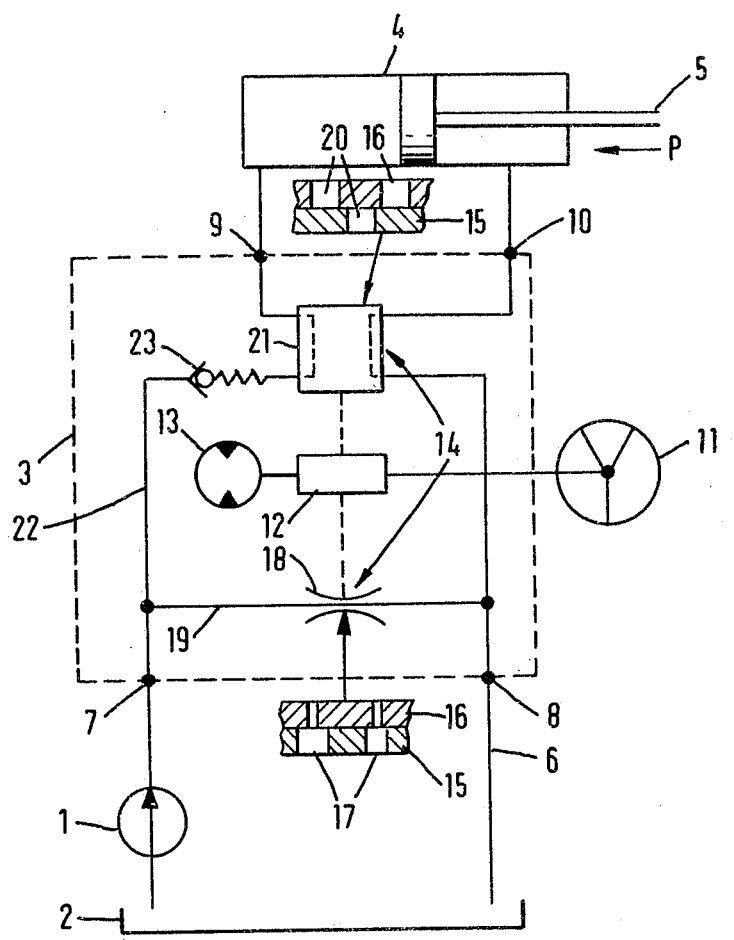
FIG. 1 is a connection diagram relating to the control means of the invention.

Referring to FIG. 1, a pump 1 delivers oil from a tank 2 to a working motor 4 by way of a control means 3, the piston-rod 5 of the motor actuating a steering lever system. The return oil flows back into the tank through a pipe 6. The control means therefore has a pump union 7, a return union 8 and two working motor unions 9 and 10, and is displaced by means of a steering wheel 11.

The steering means has a follower device 12. This is displaced by the steering wheel 11 on the one hand and by a measuring motor 13 on the other. The latter is so arranged in the connection system (in a manner not illustrated) that when the working motor 4 is actuated, the measuring motor is always in series therewith on the supply side. If the follower device 12 signals a relative displacement between the steering wheel 11 and the measuring motor 13, a reversing valve 14 is actuated, this being formed by two rotary slides 15 and 16 which also form parts of the follower device 12.

The reversing valve 14 has neutral position holes 17 which have three different diameters and which occupy the middle location illustrated when in the neutral position. Together they form an adjustable flow restricting means 18 through which a by-pass 19 runs in the neutral position. The reversing valve 14 also has reversing openings 20 which are illustrated diagrammatically in the box 21 and which, when relative displacement occurs, establish a working path 22 which passes through the measuring motor 13 and the working motor 4. One of the possible connections is shown in broken lines in the box 21. As will be seen from the position of the holes 17 and 20, the neutral position holes 17 are not completely closed when the reverse openings 20 are uncovered.

A non-return valve 23 is provided in the working path 22 and in a section of this path through which fluid flows in one direction and at a position to the rear of the point at which said path branches from the by-pass 19. This results in operations proceeding in the following manner:

If if is assumed that the steering wheel 11 has been turned so far that the working path connection illustrated in the box 21 is established, then the rod 5 of the working motor 4 is displaced to the right of the drawing. If a force opposed to this displacement is applied to the rod 5, the piston seeks to force pressurized fluid from the left hand piston compartment in a direction opposite that in which oil was previously delivered. If the non-return valve 23 were not present and the flow restricted means 18 were open a little, the pressurized fluid could flow unrestrictedly into the return part by way of the by-pass 19 and the flow restricting means 18. The measuring motor 13 would be turned in a direction opposite to that of the previous direction of rotation and after moving through a small angle would drive the steering wheel 11. This return flow, and thereafter the impact on the steering wheel 11, is inhibited by the non-return valve 23. During all this, the non-return valve 23 does not interfere with normal operation since the fluid never flows in the opposite direction through the associated duct of the working path during such operation.

Figure 2:
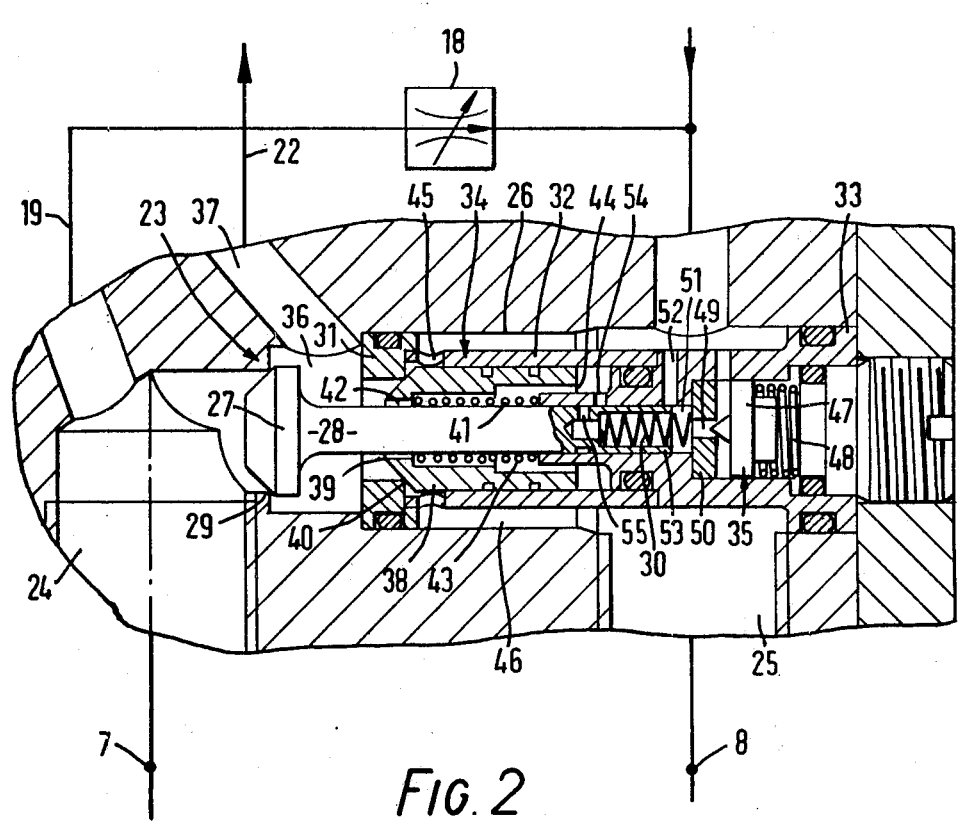
FIG. 2 is a section through part of one embodiment of the invention.

In the arrangement shown in FIG. 2, a bore 24 runs from the pump union 7 and a bore 25 from the return union 8. The two bores are interconnected by way of a stepped tranverse bore 26. The nonreturn valve 23 has a closing member 27, a spindle 28, a seat 29, and a spring 30. Fitted in the bore 26 is a multi-part insert which consists of a ring 31, a sleeve 32, and a plug 33 which closes the bore 26. Formed within this insert is an emergency control valve 34 and an excess-pressure valve 35 which are both able to open in the direction of the return side. Consequently, there is provided a duct 36, from the periphery of which a passage 37 leads to the reverse openings 20 and which is closed off on the pump side by the non-return valve 23 and on the return side by the emergency control valve 34 and the excess-pressure valve 35.

The emergency control valve has a closing member in the form of a hollow plunger 38 which, midway along its end-face 39, bears against a sealing edge 40 of the ring 31. The interior 41 of the hollow plunger communicates with the duct 36 by way of a flow rstricting point 42 and contains a spring 43. The rear end face 44 of the hollow plunger is therefore greater than that portion of the front end face 39 exposed to the same pressure. When the emergency control valve 34 opens, the duct 36 communicates with the return side by way of bores 45 and an annular chamber 46.

The excess-pressure valve 35 has a closing member 47 which is loaded by a spring 48 and closes off a hole 49 which is formed in a disc 50 inserted in the plug 33. Upstream of the opening 49 is a space 51 which communicates with the return bore 25 by way of a bore 52. The end of the spindle 28 is formed as a slide 53 which closes the bore 52 when the non-return valve 23 is opened, and by way of the bores 54 and 55 thus establishes a connection between the interior 41 of the hollow plunger 38 and the chamber 51 upstream of the excess-pressure valve 35.

The following different operational conditions can occur when this control means is used:

1. The non-operative condition of the valves as illustrated in the drawing.
2. When the reversing valve is displaced by the follower device, and the neutral-position holes 17 begin to close, there occurs, upstream of the flow restricting point 18, a pressure which is high enough to open the non-return valve 23. The emergency control valve 34 remains closed since the rear face 44, subjected to the pump pressure, is larger than the corresponding part of the forward end face 39.
3. When a force opposed to that of the longitudinal displacement is applied to the working motor, a pressure occurs in the duct 36 that is higher than the pump pressure in the bore 24. The non-return valve 23 consequently closes. In this condition too, the emergency control valve 34 remains closed since it is more heavily loaded on the rear face than on the front face. The excess-pressure valve 35 also remains closed since when the non-return valve 23 is closed the connecting holes 54 and 55 in the slide 53 do not register with each other.
4. If, during the normal steering operation i.e. when the non-return valve 23 is opened, the pump pressure were to become too high, this pressure would be transmitted to the excess-pressure valve 35 by way of the interior 41 of the hollow plunger 38, the holes 54 and 55 and the chamber 51. The excess-pressure 35 opens so that the excess pressure in the chamber 41 is relaxed. The rear end-face 44 of the hollow piston 38 is now subjected to a lower pressure than is the front end face, and the emergency control valve 34 likewise opens. A larger cross section is then available for enabling the excess pressure from the pump to be relaxed.
5. If the pump fails, and the measuring motor is actuated by means of the steering wheel 11 functioning as a hand pump, a reduced pressure, less than the pressure in the return bore 25, is set up in the duct 36. Direct connection between the return side and the duct 36 is established, and the pressurized fluid can be recirculated therethrough.

Figure 3:
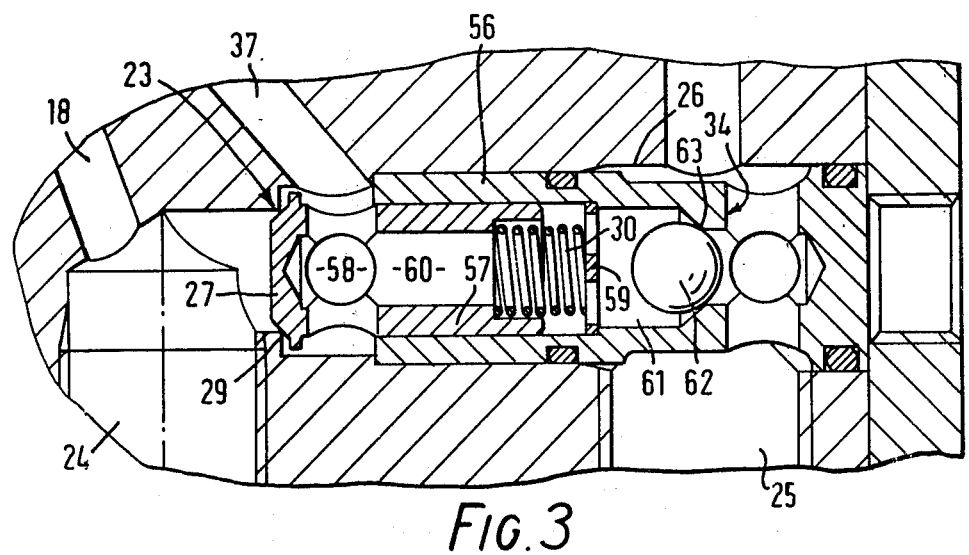
FIG. 3 is a longitudinal section through a further embodiment.

In the case of the arrangement shown in FIG. 3, parts similar to those shown in FIG. 2 are designated by the same reference numerals as used in the latter Figure. In the arrangement seen in FIG. 3, only one non-return valve and one emergency control valve are provided in the bore 26. Here, a single insert 56 is provided in the bore 26. It guides the closing member 27 of the non-return valve 23 which for this purpose is formed at a hollow cylinder 56 and has transverse perforations 58. The spring 30 is backed by an orificed disc 59, so that the interior 60 of the hollow plunger 57 and the chamber 61 in the insert 56 correspond to the duct 36. The emergency control valve 34 has a ball 62 which cooperates with a seat 63 in the insert 34.

We claim:

1. A control valve assembly for a hydrostatic steering system comprising a casing, inlet and outlet passages in said casing connectable on one side to a pump and a return tank and on the other side to a motor reversing valve unit, a bypass control passage connecting said inlet and outlet passages, a spring biased check valve for said inlet passage openable for normal operation at a predetermined pressure difference in said inlet passage between the up and downstream sides of said check valve, a spring biased excess pressure valve having fluid communication with said bypass passage, cooperable valve openings in said check valve and in said casing which control a subsidiary passage between said inlet passage and said excess pressure valve and which are aligned when said check valve is open.

2. A control valve assembly according to claim 1 including emergency control valve means in said bypass passage including a valve seat fixed relative to said casing and a spring biased closure member, said closure member being openable in the same direction as said check valve when the pressure in said outlet passage exceeds the pressure in said inlet passage on the downstream side of said check valve when said check valve is closed.

3. A control valve assembly according to claim 2 wherein said check valve has a spindle extending in said bypass passage, said subsidiary passage and one of said valve openings being formed in said spindle, a fixed sleeve in said bypass passage, said emergency control valve being a cylindrically shaped slide valve disposed internally of said sleeve in surrounding relation to said spindle.

* * * * *